United States Patent [19]
Tatum

[11] 3,885,450
[45] May 27, 1975

[54] SPEED-SETTING ARRANGEMENT FOR CAR ACCELERATOR PEDAL

[76] Inventor: Harold E. Tatum, 4605 St. Rita Dr., Louisville, Ky. 40219

[22] Filed: Apr. 10, 1974

[21] Appl. No.: 459,536

[52] U.S. Cl. ............... 74/513; 74/526; 74/560; 123/97 R
[51] Int. Cl. .............................................. G05g 1/14
[58] Field of Search ............. 74/513, 512, 526, 560; 123/97 R; 180/77 R

[56] References Cited
UNITED STATES PATENTS

| | | | |
|---|---|---|---|
| 2,924,117 | 2/1960 | Byrd, Sr. | 74/526 |
| 3,641,837 | 2/1972 | Dean, Jr. | 74/513 |
| 3,721,309 | 3/1973 | Donaldson | 74/513 X |

Primary Examiner—Samuel Scott
Assistant Examiner—F. D. Shoemaker
Attorney, Agent, or Firm—Arthur F. Robert

[57] ABSTRACT

A vertically-arranged obtuse-angled throttle-control lever, which has an upper forwardly-biased throttle-connected end and a lower rearwardly-biased foot-operated end, is pivotally secured at the horizontal axis of its apex to the firewall of an automobile for rocking movement. During acceleration from idling to full speeds, the lower operating end of this lever moves out of its normal biased idling position forwardly toward the firewall successively through a speed-setting position to a full throttle position.

An accelerator pedal is pivotally mounted on the lower end portion of the lever for movement bodily therewith to all of said positions and for rocking movement relative thereto between said speed-setting and full throttle positions. The lowermost end portion of the lever extends beyond its pedal pivot. This extension, which is short, is directed obliquely downward at an acute angle relative to the projected long axis of the lever between its apex and pedal pivots. The pedal is biased to urge its lower end in a direction proceeding forwardly toward the firewall and press resiliently against the lever's oblique extension.

A stop is mounted on the lower end portion of the pedal to extend between the pedal and the firewall in position to bridge the space therebetween partly when said pedal pivot is on the rear side of said speed-setting position and to bridge that space completely when the pedal pivot of the pedal-actuated lever reaches its speed-setting position where the stop slidably engages the firewall. Now, if the lowermost end of the lever is moved forwardly beyond its speed-setting position towards its full throttle position, the stop's slidable engagement with the firewall will force the pedal to rock out of its given biased position on the lever, and thus move relative to the lever. During this relative movement, the lower end portion of the pedal moves away from the oblique extension of the lever, the upper end portion of the pedal moves toward the lever and the stop slides downwardly along the firewall.

4 Claims, 7 Drawing Figures

SPEED-SETTING ARRANGEMENT FOR CAR ACCELERATOR PEDAL

BACKGROUND OF THE INVENTION

1. Field of The Invention

This invention relates to the art of controlling the acceleration foot pedal of an automobile in a manner preventing the car from being unintentionally operated at a speed beyond a preset limit while permitting the pedal to be freely operated intentionally beyond that limit.

2. Description Of The Prior Art

The Byrd, Sr. U.S. Pat. No. 2,924,117 shows an adjustable speed setting accelerator pedal assembly comprising: a lower pedal 18 pivoted to the floor at its front end; an upper pedal 34 pivoted at its rear end to the rear end of pedal 18; and a stop 30 interposed between the pedals and adjustably mounted on pedal 18 for forward-rearward movement slidably along the lower pedal 18 to selected positions. In a selected position, the stop 30 will limit the pivotal movement of upper pedal 34 relative to the lower pedal 18, which remains in its initial position with its rear free end touching the floor and thus provide a selected speed setting. To override it, pressure is applied to the front end of the upper pedal 34 so that it rocks forwardly around the top of stop 30. The rear end of the floor engaging lower pedal 18 rocks upwardly while the front end of the upper pedal 34 rocks downwardly to effect the speed increasing override.

The Donaldson U.S. Pat. No. 3,721,309 shows a vertically-arranged obtuse-angled throttle-control lever, which has an upper throttle-connected end and a lower foot-operated end, pivotally secured at its apex to the firewall of an automobile for rocking movement. During full acceleration, the lower operating end of this lever moves toward the firewall from a normal idling position through a speed setting position to a full throttle position. An accelerator pedal is pivotally mounted on the lower end portion of the lever for movement bodily therewith between normal idling and full throttle positions. A resiliently biased piston is connected to the upper end portion of the lever between its pivot and its throttle-connected end. This connection is limp between the idling and speed setting positions. It becomes taut at the speed setting position and thus resiliently opposes movement toward the full throttle position.

SUMMARY OF THE INVENTION

OBJECTS OF THE INVENTION

The principal object of the present invention is to provide a speed-setting feature which is extremely simple in design, correspondingly inexpensive to manufacture and install, easily and quickly installed by the factory, the automobile dealer or the automobile user and, when installed, easily and quickly adjusted to any of a limited range of speed-setting positions.

Another important object is to provide an extremely simple speed-setting device which can be easily and quickly overridden to produce full throttle action whenever desired and thereafter easily and quickly returned to any desired position including its speed-setting position.

STATEMENT OF THE INVENTION

The foregoing objects of my invention may be achieved by applying the invention to a throttle-control lever and accelerator pedal assembly of the character shown in the Donaldson U.S. Pat. No. 3,721,309. Specifically stated, said objects are achieved by extending the lower end portion of the lever downwardly beyond the accelerator pedal pivot, by biasing the lower end portion of the accelerator pedal resiliently against that lever extension and by providing a stop between the lower end portion of the accelerator pedal and the firewall in position to bridge the space therebetween partially between idling and speed-setting positions and to bridge that space completely when the speed-setting position is reached while permitting the pedal to be rocked about its lever pivot which contemporaneously permits the lower end of the lever to be moved forwardly beyond its speed-setting position and toward its full throttle position.

BRIEF DESCRIPTION OF THE DRAWINGS

The invention is illustrated in the accompanying drawings wherein.

DESCRIPTION OF THE PREFERRED EMBODIMENT

Figure 1:
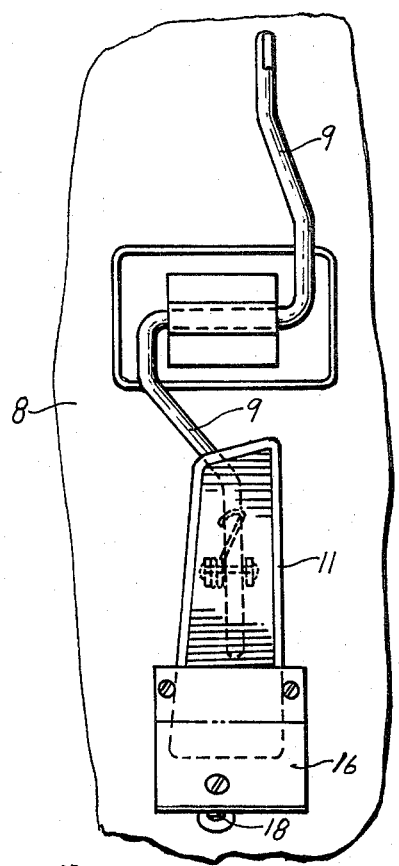
FIG. 1 is a face view of the preferred embodiment of my invention showing the device as it appears from the driver's seat of the automobile.

FIGS. 1 through 4 show my speed-setting attachment mounted on the firewall 8 of an automobile or like vehicle. As shown, it conventionally comprises: an obtuse-angled throttle-connected lever 9 vertically arranged and pivotally mounted at its apex to the firewall 8 for rocking movement about a horizontal axis 10 (see FIG. 5); and a foot-operated pedal 11 pivoted to the lower end portion of the lever 9 for pivotal movement about the horizontal axis of its pivot.

In accordance with my invention, the lever 9 is extended, for a short distance, say 1 inch, immediately beyond the pivotal axis of the pedal 11, and this extension 9a (see FIG. 2) is bent to project obliquely downward at an angle of about 30°, more or less, relative to the projected long axis of the lower end portion of lever 9 between apex and pedal pivots, while the accelerator pedal 11 is biased at its pivotal axis by spring 12 so that the lower "half" of the pedal 11 normally presses resiliently forward against the oblique downward extension 9a of lever 9.

In further accordance with my invention, the lower end of the accelerator pedal 11 is provided with an attachment, comprising: a plate member 16 rigidly bolted or otherwise secured to the lower end of the pedal; a threaded boss 17 rigidly secured to the underside of the lower end portion of plate 16 and arranged to depend rigidly therefrom; and an adjusting screw 18 threaded to the boss 17.

Figure 2:
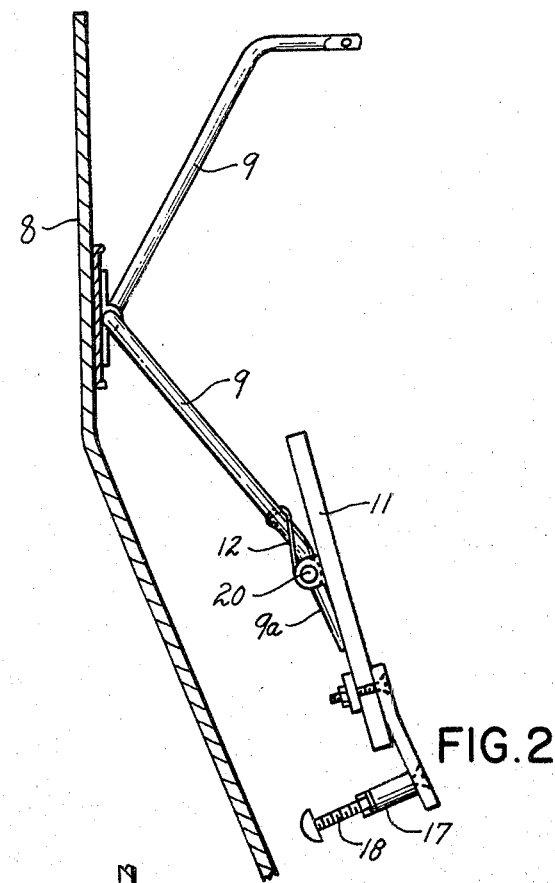
FIGS. 2, 3 and 4 are side elevational views of FIG. 1 respectively showing the device in idling, speed-setting and full throttle positions.

In operation, the lever 9 and the accelerator pedal 11 normally occupy the idling position shown in FIG. 2. When it is desired to operate at a level ground speed of say 50 miles per hour, the screw 18 is appropriately adjusted within its threaded boss 17 to its 50 mile setting and the lever and pedal 5 are pressed toward the firewall 8 until the screw 18 strikes the firewall and thereby reaches the speed-setting position. In this speed-setting position, the automobile will travel at 50 miles per hour on level ground if the screw 18 is properly adjusted. If it should be desired to increase the level ground speed above 50 miles per hour, then the foot pedal pressure is shifted enough to move the lever 9 and pedal 11 to or toward the full-throttle position shown in FIG. 4.

Figures 4, 5, 7:
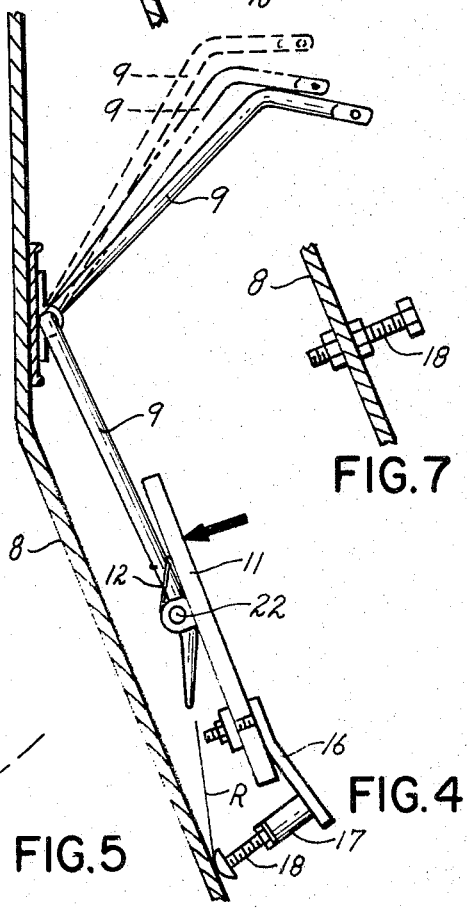
FIG. 5 is a schematic view showing the idling, speed-setting and full throttle positions of the pedal pivot in relation to the lever pivot and also showing the corresponding positions of the floor-contacting portion of the stop.
FIG. 7 is a modification showing the stop mounted on the firewall.

For a given set speed, the relative positions of the pivotal axis of the accelerator pedal are indicated in FIG. 5 by numerals 20–22 wherein numeral 20 designates the idling speed position, numeral 21 the speed-setting position and numeral 22 the full-throttle position. FIG. 5 also designates the corresponding positions of the contact point of the stop screw 18 relative to the firewall 8 by the numerals 20', 21' and 22'. From this figure, it will be understood that if the accelerator pivot moves from the speed-setting position to the full throttle position, the contact point of screw 18 will slide downwardly along the firewall from position 21' to 22'.

Figures 3, 6:
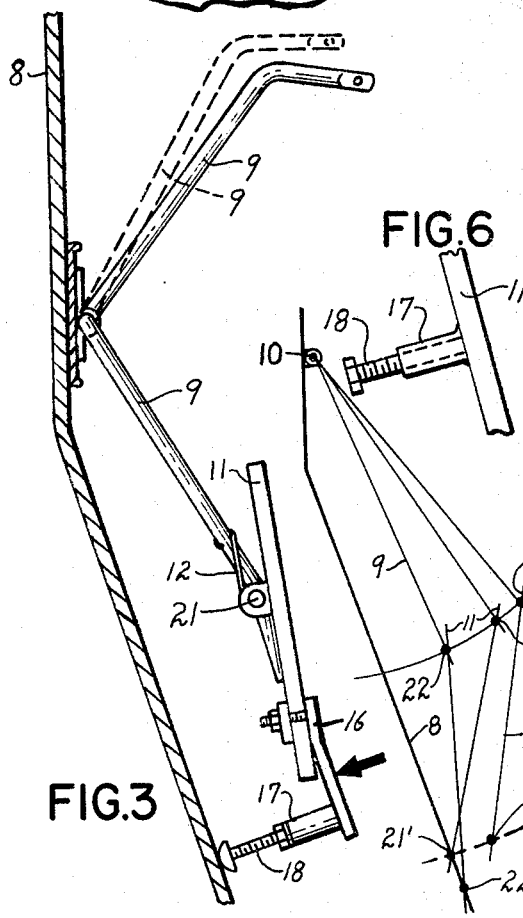
FIG. 6 is a modification showing the stop incorporated as a part of the accelerator pedal rather than an attachment thereto.

In FIG. 6, the arrangement is simplified by securing the boss 17 to the underside of the accelerator pedal 11 with the screw 18 remaining adjustably threaded to the boss.

In FIG. 7, a variation of the stop arrangement shown in FIGS. 1–5 and 6 wherein an adjusting screw 18 is adjustably mounted to the firewall 8.

It will be appreciated that the upper end of the pedal 11 may be rearwardly biased against a fixed part carried by the lever 9 but the extension 9a is preferred because of its simplicity.

Having described my invention, I claim:

1. In a car accelerator arrangement for use with an obtuse-angled throttle-connected lever vertically-arranged and normally biased in its normal idling position, in which its upper and lower ends are urged forwardly and rearwardly respectively, and pivotally secured at its apex to the firewall of a car for swinging movement about the horizontal axis of its apex out of said idling position against said bias through a speed-setting position to a full-throttle position, an improved speed-setting arrangement comprising:
   A. a pedal pivot on the lever near its lower end;
   B. a foot-operated accelerator pedal, having upper and lower portions, and pivoted at its mid-portion to said pedal pivot for movement bodily therewith to all of said positions and for rocking movement relative thereto between said speed-setting and full-throttle positions;
   C. means biasing the accelerator pedal so that its lower portion is normally urged resiliently forward into a given angular position relative to said lever; and
   D. stop means mounted between the lower end portion of the pedal part and the firewall part in position to bridge the space therebetween partially when said pedal pivot is on the rear side of said speed-setting position and to bridge said space completely when said pedal pivot is moved forwardly into said speed-setting position.

2. The arrangement of claim 1 wherein:
   A. said stop means engages one of said parts slidably in said speed-setting position and slides along the slidably engaged part when the pedal is moved forwardly beyond its speed-setting position, said stop means being operative, during such forward movement of the pedal to rock the pedal out of its aforesaid given position against the bias of said pedal.

3. The arrangement of claim 1 wherein:
   A. the lower end portion of the lever beyond said pedal pivot is extended obliquely downward at an acute angle relative to the projected long axis of the lever between its apex and pedal pivots; and
   B. said pedal biasing means normally urges the lower portion of the pedal forward to press resiliently against the said oblique extension of the lever.

4. The arrangement of claim 3 wherein:
   A. said stop means engages one of said parts slidably in said speed-setting position and slides along the slidably engaged part when the pedal is moved forwardly beyond its speed-setting position, said stop means being operative, during such forward movement of the pedal, to rock the pedal out of its aforesaid given position against the bias of said pedal.

* * * * *